Patented Aug. 18, 1953

2,649,457

UNITED STATES PATENT OFFICE 2,649,457

PREPARATION OF ARYLENETHIAZOLE VULCANIZATION ACCELERATORS

David J. Beaver, Richmond Heights, Mo., assignor to Monsanto Chemical Company, St. Louis, Mo., a corporation of Delaware No Drawing. Original application November 24, 1948, Serial No. 61,897. Divided and this application May 14, 1951, Serial No. 226,295

3 Claims. (Cl. 260—306.5)

This invention relates to the vulcanization of rubber and to the vulcanized rubber products obtained thereby. More particularly it relates to a new and novel group of vulcanization accelerators.

The rubber industry has long concluded that for most purposes no single accelerator is capable of producing satisfactory vulcanizates and as a result the research chemist and the rubber technologist have sought a combination of compounds, one or both capable of vulcanizing rubber, which will give satisfactory properties as to rate of cure, absence of scorch and desirable physical properties in the vulcanizates. A combination of compounds, particularly a combination of accelerators, offers a great range of compound variation such that a series of combinations varying in scorch and curing properties may be obtained.

It has been found in accordance with this invention that heating a free mercaptan of the structure

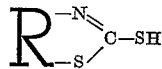

where R is an arylene nucleus with a sulfur halide in the absence of a solvent, with elimination of hydrogen halide, produces stable complex products possessing accelerating properties. It is preferred to employ sulfur monohalides since much more potent accelerators are obtained than from sulfur dihalides. The preferred class of condensation products represent a class of economical, non-scorchy, readily compatible accelerators which per se produce low modulus vulcanizates and when employed in conjunction with basic secondary accelerators are strongly activated thereby producing vulcanizates of high modulus.

Compounds possessing the group

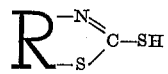

are members of a well defined class of compounds comprising 2-mercapto arylene thiazoles and their alkyl, aralkyl, cycloalkyl, halogen, hydroxy, amino, and nitro arylene substituted analogues. As specific examples of compounds possessing the desired grouping are 2-mercaptobenzothiazole, 2 - mercaptonaphthothiazole, 2-mercapto-4-methyl benzothiazole, 2-mercapto-4,6 - dimethyl benzothiazole, 2 - mercapto - 4-chlorobenzothiazole, 2-mercapto-6-phenyl benzothiazole, and 2 - mercapto - 6 - ethoxy benzothiazole.

The new accelerators are readily prepared by condensing a free mercapto arylene thiazole with a sulfur halide at a temperature preferably above the melting point of the particular mercapto arylene thiazole. While the condensation is preferably carried out by reacting the molten mercapto thiazole with the sulfur halide, lower temperatures may be used if desired providing hydrogen chloride is eliminated. As exemplary of the preparation of the new accelerators, the following example is illustrative and it is to be understood that it is not limitative thereof.

EXAMPLE 1

173.1 parts by weight (substantially 1.0 mol) of 2-mercaptobenzothiazole was placed in a 3-neck flask equipped with a thermometer, a stirrer, and a reflux condenser. The reaction vessel was then immersed in an oil bath at 195° C. To the molten mercaptobenzothiazole was added dropwise 75.0 parts by weight (substantially 0.5 mol) of sulfur monochloride with stirring over a one-half hour period. An evolution of hydrogen chloride accompanied the addition of the sulfur monochloride. The agitation continued for one-half hour, the evolution of hydrogen chloride ceasing. A dark yellow-brown syrup formed which was taken up in toluene, washed with water and dilute caustic soda, and evaporated to dryness. 200.0 parts by weight of a yellow gum like material was obtained which was then recrystallized several times from hot methyl alcohol. A yellow crystalline material was isolated having a melting point of 119°–121° C. and a sulfur and nitrogen content respectively of substantially 50.0% and 6.8%.

The above prepared complex condensation product is not to be confused with the reaction product of Levi, Gazz. chim. ital., 61, pp 383–387, 1931, who describes the reaction of sulfur monochloride with the zinc salt of mercaptobenzothiazole in a cold atmosphere. Levi identified the reaction product as mercaptobenzothiazole tetrasulfide having a melting point of 108°–110° C. Furthermore, the process is to be distinguished from that of Carson in U. S. 1,661,998 who oxidizes mercaptobenzothiazole in a solvent by means of sulfur chloride and then separates the disulfide from the sulfur by means of a solvent as for example benzene. It will be noted that the product of the foregoing example is completely soluble in toluene and is free of uncombined sulfur.

The yellow gum like condensation product, above prepared, was incorporated in a typical gum stock comprising

|  | A | B |
|---|---|---|
| Pale crepe rubber_____parts by weight__ | 100 | 100 |
| Zinc oxide_____do____ | 5 | 5 |
| Sulfur_____do____ | 3 | 3 |
| Stearic acid_____do____ | 1 | 1 |
| Diphenyl guanidine_____do____ |   | 0.375 |
| Mercaptobenzothiazole-S₂Cl₂ condensation product of Example 1_____do____ | 1 | 0.75 |

The rubber stocks so compounded were vulcanized in the usual manner by heating in a press for different periods of time at 142° C. The physical properties of the cured rubber products are set forth below.

Table I

|  | Min. cure at 142° C. | A | B |
|---|---|---|---|
| 300% modulus, lbs./in.² | 15 | 63 | 263 |
|  | 30 | 60 | 313 |
|  | 45 | 80 | 350 |
|  | 60 | 120 | 273 |
|  | 90 | 110 | 240 |
| 500% modulus, lbs./in.² | 15 | 130 | 1,103 |
|  | 30 | 170 | 1,147 |
|  | 45 | 250 | 1,250 |
|  | 60 | 317 | 1,087 |
|  | 90 | 300 | 953 |
| Ultimate tensile, lbs./in.² | 15 | 1,940 | 3,853 |
|  | 30 | 2,123 | 3,907 |
|  | 45 | 2,280 | 3,520 |
|  | 60 | 2,247 | 3,497 |
|  | 90 | 2,333 | 3,350 |
| Ultimate elongation, percent | 15 | 887 | 683 |
|  | 30 | 867 | 677 |
|  | 45 | 810 | 657 |
|  | 60 | 793 | 657 |
|  | 90 | 797 | 677 |

From the data set forth above it is shown that the condensation product of sulfur monochloride and mercaptobenzothiazole is an accelerator and when employed in conjunction with a guanidine accelerator exhibits fast curing properties.

As further exemplary of the exceptional accelerator properties and the activation potential of the new accelerators the yellow gum like mercaptobenzothiazole-sulfur chloride condensation product, above prepared, was incorporated in a typical tread stock comprising

| Stock | C | D | E |
|---|---|---|---|
| Smoked sheets rubber____parts by weight__ | 100 | 100 | 100 |
| Zinc oxide_____do____ | 5 | 5 | 5 |
| Sulfur_____do____ | 3 | 3 | 3 |
| Carbon black_____do____ | 50 | 50 | 50 |
| Stearic acid_____do____ | 3 | 3 | 3 |
| Pine tar_____do____ | 2 | 2 | 2 |
| Blend of acetone-amino biphenyl reaction product and diphenyl-p-phenylene-diamine_____do____ | 1.5 | 1.5 | 1.5 |
| Diphenyl guanidine_____do____ |   | 0.25 | 0.375 |
| Mercaptobenzothiazole-S₂Cl₂ condensation product of Example 1_____do____ | 0.75 | 0.75 | 0.75 |

The rubber stocks so compounded were vulcanized in the usual manner by heating in a press for different periods of time at 292° F. The physical data of the cured rubber products are set forth below.

Table 2

|  | Min. cure at 292° F. | C | D | E |
|---|---|---|---|---|
| 300% modulus in lbs./in.² | 15 | 470 | 906 | 1,075 |
|  | 30 | 832 | 1,385 | 1,550 |
|  | 45 | 1,090 | 1,610 | 1,640 |
|  | 60 | 1,230 | 1,655 | 1,735 |
|  | 90 | 1,290 | 1,620 | 1,720 |
| 500% modulus in lbs./in.² | 15 | 1,150 | 2,080 | 2,550 |
|  | 30 | 2,000 | 3,010 | 3,385 |
|  | 45 | 2,435 | 3,320 | 3,420 |
|  | 60 | 2,605 | 3,310 | 3,490 |
|  | 90 | 2,710 | 3,240 | 3,440 |
| Ultimate tensile in lbs./in.² | 15 | 2,130 | 3,040 | 3,745 |
|  | 30 | 3,120 | 4,000 | 4,255 |
|  | 45 | 3,470 | 4,000 | 4,240 |
|  | 60 | 3,335 | 3,960 | 4,050 |
|  | 90 | 3,335 | 3,740 | 3,790 |
| Ultimate elongation, percent | 15 | 700 | 630 | 650 |
|  | 30 | 660 | 615 | 605 |
|  | 45 | 635 | 580 | 600 |
|  | 60 | 605 | 590 | 580 |
|  | 90 | 590 | 560 | 590 |

It is obvious from the above tabulated data that the mercaptobenzothiazole-sulfur halide condensation products are a class of excellent non-scorch, low modulus producing vulcanization accelerators which are readily activated to produce vulcanizates of a range of high moduli and possessing a long range of cure.

Other basic nitrogen containing accelerators than diphenyl guanidine may be employed in conjunction with the new accelerators, as for example, di-p-tolyl guanidine, dixylyl guanidine, triphenyl guanidine, and the like. The biguanides and the aldehyde-amine accelerators may be incorporated also as coaccelerators or activators in a rubber stock to produce desirable properties both in stock processing and in the final product.

As further embodiments of the invention illustrating accelerating properties in synthetic rubber the mercaptobenzothiazole-sulfur monochloride condensation product was incorporated in a typical synthetic rubber stock comprising

| Stock | F |
|---|---|
| GR-S rubber_____parts by weight__ | 100 |
| Carbon black_____do____ | 40 |
| Zinc oxide_____do____ | 3 |
| Sulfur_____do____ | 1.5 |
| Mercaptobenzothiazole-S₂Cl₂ condensation product__do____ | 1.0 |

The synthetic rubber stock so compounded was vulcanized in the usual manner by heating in a press for 45 minutes at 142° C. The physical data of the cured rubber product are set forth below.

Table 3

| Stock | F |
|---|---|
| 300% modulus in lbs./in.² | 775 |
| Ultimate tensile in lbs./in.² | 1,535 |
| Ultimate elongation, percent | 540 |

The amount of the new accelerators employed will vary depending upon whether or not they are admixed with other accelerators, the type of stock, the type of rubber, the temperature of cure, the time of cure, the particular accelerators involved, and the objectives of the compounder, i. e. whether a low or high modulus is required.

By the term rubber as employed in the appended claims is meant rubber in a generic sense which includes natural as well as synthetic rubbers which are capable of vulcanization when heated with sulfur and includes latices and reclaims of such materials whether or not admixed with pigments, fillers, softeners, antioxidants, etc.

By the term condensation as employed in the specification and in the appended claims is meant the union of two unlike molecules, accompanied by the elimination of a simple molecule, e. g. in the present case the simple molecule eliminated is hydrogen chloride.

While specific embodiments of the invention have been described in detail herein, it will be understood that the invention is not limited but that various modifications may be made therein without departing from the spirit or scope of the invention.

This is a division of co-pending application Serial No. 61,897, filed November 24, 1948, now abandoned.

What is claimed is:

1. Method of making an accelerator composition which comprises heating with elimination of hydrogen halide in the absence of a solvent above the melting point of the thiazole substantially two molecular proportions of a free mercaptoarylenethiazole and substantially one molecular proportion of a sulfur mono halide and recovering a composite reaction product.

2. Method of making an accelerator composition which comprises heating with elimination of hydrogen halide in the absence of a solvent above the melting point of the thiazole substantially two molecular proportions of a mercaptobenzothiazole and substantially one molecular proportion of a sulfur mono halide and recovering a composite reaction product.

3. Method of making an accelerator composition which comprises heating with elimination of hydrogen chloride in the absence of a solvent above the melting point of the thiazole substantially two molecular proportions of 2-mercaptobenzothiazole and substantially one molecular proportion of sulfur monochloride and recovering a composite reaction product.

DAVID J. BEAVER.

References Cited in the file of this patent

UNITED STATES PATENTS

| Number | Name | Date |
|---|---|---|
| 1,661,998 | Carson | Mar. 6, 1928 |

FOREIGN PATENTS

| Number | Country | Date |
|---|---|---|
| 382,940 | Great Britain | Oct. 31, 1932 |